United States Patent [19]
Butti et al.

[11] 3,899,481

[45] Aug. 12, 1975

[54] PROCESS FOR THE CONTROLLED PARTIAL DEGRADATION OF DEOXYRIBONUCLEIC ACID EXTRACTED FROM ANIMAL ORGANS

[75] Inventors: Adriano Butti, Como; Giuseppe Prino, Milan; Gianfranco Bertellini, Maslianico, all of Italy

[73] Assignee: Crinos Industria Farmacobiologica S.A., Villa Guardia, Italy

[22] Filed: Feb. 6, 1974

[21] Appl. No.: 440,269

Related U.S. Application Data

[63] Continuation-in-part of Ser. No. 194,917, Nov. 2, 1971, abandoned.

[30] Foreign Application Priority Data

Nov. 3, 1970 Italy .................................. 31308/70

[52] U.S. Cl. .......................... 260/211.5 R; 424/180
[51] Int. Cl.² ......................................... C07H 21/04
[58] Field of Search .............................. 260/211.5 R

[56] References Cited

UNITED STATES PATENTS

| | | | |
|---|---|---|---|
| 2,379,912 | 7/1945 | Laufer ........................ | 260/211.5 R |
| 3,157,637 | 11/1964 | Khym ......................... | 260/211.5 R |
| 3,215,687 | 11/1965 | Tsuchiya et al. ............. | 260/211.5 R |

*Primary Examiner*—Johnnie R. Brown
*Attorney, Agent, or Firm*—Browdy and Neimark

[57] ABSTRACT

A process for the controlled partial degradation of deoxyribonucleic acid (DNA) comprising the following steps: (1) dissolution of the alkali salt of DNA in water; (2) heating of the solution at 50°–90° C. in the presence of a proton releasing substance at a pH between 3.5 and 7 and for a time from 3 to 5 hours; (3) precipitation of the product of degradation by means of adding to the solution a liquid which is non-solvent of the product itself.

10 Claims, No Drawings

PROCESS FOR THE CONTROLLED PARTIAL DEGRADATION OF DEOXYRIBONUCLEIC ACID EXTRACTED FROM ANIMAL ORGANS

DISCLOSURE OF THE INVENTION

This is a continuation-in-part of application Ser. No. 194,917, filed Nov. 2, 1971 now abandoned.

The present invention relates to a process for the controlled partial degradation of deoxyribonucleic acid extracted from animal organs. In U.S. Pat. No. 3,770,720 by the same applicants as present, is disclosed a process for the extraction, on an industrial scale, from animal organs, of deoxyribonucleic acid as alkali salts. The alkali salts of deoxyribonucleic acid obtained according to the above mentioned process or the alkali salts of nucleic acids extracted from natural sources, such as animal or vegetable tissues, are characterized by the fact that their aqueous solutions have a very high viscosity.

The viscosity of the aqueous solutions of the above mentioned alkali salts of extractive nucleic acids is an important parameter for the therapeutic use of said salts in the field of fibrinolytic medicines. In fact it has been ascertained that the optimal values of the viscosity of the aqueous solutions of the sodium salt of deoxyribonucleic acid for therapeutic purposes by means of parenteral administration are in the range from 1.25 to 1.80 centipoises (values obtained with the Hoppler viscometer and according to the method which will be described with more detail hereinbelow). Since the viscosity of deoxyribocleic acid (sodium salt), obtained from the above-mentioned process, and in general the viscosity of extractive nucleic acids, is substantially higher than the above-indicated values, it is necessary to carry out, when the extraction is terminated, a controlled treatment for denaturing and partially degrading the alkali salts of the deoxyribo-nucleic acid in order to bring the value of viscosity within the above indicated range. It has been actually ascertained that, in case the degrading treatment is carried out too far and up to the formation of a mixture of monomer nucleotides, the consequence is a progressive decrease and finally the disappearance of their biological activity.

It is therefore an object of the present invention to provide a process for the partial degradation of the alkali salts of deoxyribonucleic acid (DNA), which comprises the following steps:

1. dissolution of the alkali salt of DNA in water;
2. heating of the solution at 50°–90° C. in the presence of a proton releasing substance at a pH between 3.5 and 7 and for a time from 3 to 5 hours;
3. precipitation of the product of degradation by means of adding to the solution a liquid which is a non-solvent of the product itself.

The operating step (2) is preferably carried out on an industrial scale using as proton releasing substance any water soluble organic acid such as dilute acetic acid in the presence of sodium acetate or a cation resin in aqueous medium.

The following examples will better illustrate without any limitation the process of partial degradation of the nucleotides according to the present invention.

The viscosity of each of the substances described in the following examples is measured in a 0.5 molar solution of sodium chloride in which the substance has been dissolved in a concentration of 1%. The tests have been carried out at 20° C. in a Hoppler viscometer ($\phi$ internal tube of 15.950 mm; falling distance 100 mm), using the sphere N. 1 ($\phi$ mm. 15.805; weight gr. 4.9848). Under these conditions the 0.5 molar solution of sodium chloride gives a falling time of the sphere of 70.8 sec. corresponding to 0.9841 centipoises.

Example 1

Ten parts by weight of sodium salt of DNA extracted from animal organs according to the process which forms the subject matter of U.S. Pat. No. 3,770,720 of the same applicants, having the following analytical characteristics:

| | | | |
|---|---|---|---|
| Viscosity | 2.5993 centipoises | S | absent |
| P | 8.69% | Total bases | 33.6% |
| N | 14.04% | Deoxyribose | 23.4% |
| Na | 9.10% | | | are dissolved at 70° C. in 200 parts of deionized water containing 27 parts of sodium acetate hydrate, and 30 parts by volume of glacial acetic acid are added. After 4 hours of heating at 70° C. the solution is neutralized with 5N sodium hydroxide and the solute is precipitated by adding to the solution 1.1 parts by volume of methanol to each 1 part by volume of the solution.

8 parts by weight of depolymerized material are separated with the following analytical characteristics:

| | | | |
|---|---|---|---|
| Viscosity | 1.5707 centipoises | Na | 9.20% |
| P | 8.62% | Total Bases | 33.5% |
| N | 14.04% | Deoxyribose | 23.6% |

By extending the heating procedure of the above solution up to 7.5 hours the viscosity of the resulting product decreases to 1.3205 centipoises while the other analytical parameters and the ponderal yield remain substantially unchanged.

EXAMPLE 2

5 parts by weight of a sodium salt of DNA extracted from animal organs and having a viscosity which is so high that its determination according to the above-mentioned method is not possible, are dissolved in 500 parts by weight of water at 50° C., and 10 parts by weight of AMBERLITE RESIN IR 120, H form, (a sulfonic acid cation exchanger) are added to the solution.

The liquid is maintained at 50° C. for three hours under stirring. After this heating process the resin is removed by filtration, and the pH of the solution is adjusted to 6.5–7 by adding 2N sodium hydroxide. Finally the solution is concentrated under reduced pressure up to one-tenth of its initial volume.

The concentrated solution is filtered again under heat after addition of a filtration coadjuvant and finally it is precipitated by adding a double volume of acetone after addition of 1.5 parts by weight of NaCl. The precipitate is carefully washed with an aqueous solution of 30% acetone until a complete removal of the chlorides is accomplished.

The depolymerized material has the following analytical characteristics:

| | | | |
|---|---|---|---|
| Viscosity | 1.2927 centipoises | Na | 9.25 |
| P | 8.4% | Total Bases | 32.7% |
| N | 14.5% | Deoxyribose | 23.6% |

EXAMPLE 3

Two parts by weight of sodium salt of DNA are dissolved at 60° C. in 40 parts of deionized water containing 2.8 parts of sodium acetate hydrate and 3 parts by volume of 85% formic acid are added.

The depolymerized material has the following analytical characteristics:

| | | | |
|---|---|---|---|
| Viscosity | 1.5685 centipoises | Na | 9.05% |
| P | 8.54% | Total Bases | 33.6% |
| N | 14.11% | Deoxyribose | 23.4% |

EXAMPLE 4

This example illustrates the variations of the fibrinolytic activity of alkali DNA salts as a function of the variations of their viscosity. The concerned experiments have been carried out by measuring, on normal and pre-heated fibrin plates, the fibrinolytic activity of the euglobulinic fractions separated from rat plasma activated in vitro with oligo- or mononucleotides of extractive origin according to the method described in: Prino et Mantovani, Europ. J. Pharmacol. 6, 190, (1969).

| Substance | γ/ml of plasma | Normal plates Areas of lysis mm² average ± S.E. | % | Pre-heated plates Area of lysis average ± S.E. | % |
|---|---|---|---|---|---|
| Mononucleo- | — | 55.3 ± 2.7 | — | 40.0 ± 0.7 | — |
| tides with | 25 | 54.9 ± 2.6 | –0.8 | 40.4 ± 0.6 | +1 |
| a viscosity | 50 | 55.9 ± 2.8 | +1.2 | 40.8 ± 0.9 | +2 |
| lower than | 100 | 54.8 ± 2.9 | –0.8 | 39.8 ± 0.5 | –0.5 |
| 1.05 centip. | 200 | 53.8 ± 2.7 | +2.6 | 41.5 ± 0.8 | +3.8 |
| Oligonucleo- | — | 47.3 ± 2.7 | — | 39.3 ± 1.0 | — |
| tides with | 25 | 67.6 ± 2.1 | +43 | 52.1 ± 0.8 | +32.6 |
| a viscosity | 50 | 80.0 ± 4.2 | +69 | 63.4 ± 1.3 | +61 |
| of 1.348 | 100 | 117.7 ± 7.2 | +148 | 82.0 ± 2.2 | +109 |
| centipoises | | | | | |
| Oligonucleo- | — | 59.5 ± 3.0 | — | 46.5 ± 1.3 | — |
| tides with | 50 | 66.0 ± 4.6 | +11 | 51.9 ± 1.7 | +11.8 |
| a viscosity | 100 | 57.7 ± 2.1 | –3 | 53.1 ± 1.4 | +14.1 |
| of 1.070 | 200 | 76.8 ± 2.4 | +29 | 53.1 ± 1.0 | +14.1 |
| centipoises | | | | | |

As it appears from the above table, if the viscosity values become lower than 1.05 centipoises the corresponding substances, which are prevalently mononucleotides, are without any appreciable fibrinolytic activity.

In order to quantitatively express the fibrinolytic activity of oligonucleotides of animal origin, which are the subject of the present application, some comparative tests with xylane-polysulfuric acid and heparin have been carried out. The comparison with plasmin has been excluded, because plasmin is a direct proteolytic enzyme; likewise we have left out the comparison with such activators as streptokinase and urokinase, since they act according to an action mechanism totally different from that which can be assumed for oligonucleotides. Xylane-polysulfuric acid ($SP_{54}$) and heparin are two macromolecular substances which are also used in the so-called fibrinolysis activation therapy and act according to mechanisms which are very similar to that of the oligonucleotides.

In Example 5 there is evidenced the higher activity of oligonucleotides both with regard to the quantitative effect at equal concetrations and to response linearity up to the highest dose used. The limited response of xylane-polysulfuric acid and of heparin and their tendency to the inversion of the effect have been yet evidenced in similar experimental conditions by previous publications. These characteristics of heparin and xylane-polysulfuric acid can limit their therapeutic use; likewise their anticoagulating activity, particularly evident in heparin, represents another limiting factor of great importance.

In Example 6 there is demonstrated that oligonucleotides are devoid of anticoagulating activity at the concentrations which are effective on fibrinolytic systems.

EXAMPLE 5

This example illustrates the pharmacological activity of the compositions according to the present invention and concerns the measuring on normal and preheated fibrine plates, of the fibrinolytic activity of euglobulinic fractions separated from rat plasma activated in vitro with oligonucleotides of animal origin or with xylan-polysulfuric acid and heparin.

| Drug Use | γ/ml plasma | Normal plates areas of lysis in mm² average ± S.E. | % | Pre-heated plates area of lysis in mm² average + S.E. | % |
|---|---|---|---|---|---|
| Oligonucle- | — | 62.9 ± 3.0 | — | 44.0 ± 2.6 | — |
| otides of | 25 | 82.0 ± 2.9 | +30 | 56.2 ± 2.0 | +28 |
| aminal ori- | 50 | 114.5 ± 4.4 | +82 | 64.1 ± 2.3 | +45 |
| gin | 100 | 140.3 ± 8.9 | +123 | 71.7 ± 2.2 | +63 |
| | 200 | 145.5 ± 6.2 | +131 | 70.4 ± 2.2 | +60 |
| xylan-poly- | — | 83.0 ± 6.9 | — | 42.5 ± 0.9 | — |
| sulfuric | 25 | 126.3 ± 12.1 | +52 | 48.7 ± 1.0 | +15 |
| acid | 50 | 148.5 ± 9.7 | +79 | 56.2 ± 1.2 | +32 |
| | 100 | 153.4 ± 7.6 | +85 | 58.2 ± 0.7 | +37 |
| | 200 | 134.4 ± 5.7 | +62 | 54.5 ± 1.3 | +28 |
| Heparin | — | 88.0 ± 6.5 | — | 40.7 ± 1.1 | — |
| | 25 | 132.5 ± 12.1 | +51 | 63.5 ± 0.6 | +56 |

| Drug Use | γ/ml plasma | Normal plates areas of lysis in mm² average ± S.E. | % | Pre-heated plates area of lysis in mm² average ± S.E. | % |
| --- | --- | --- | --- | --- | --- |
| | 50 | 136.5 ± 13.2 | +55 | 82.7 ± 2.7 | +103 |
| | 100 | 88.9 ± 16.7 | +1 | 78.7 ± 4.0 | +93 |
| | 200 | 0 | | 52.4 ± 4.8 | +29 |

EXAMPLE 6

This example illustrates the pharmacological activity of the compositions according to the present invention and concerns the measuring of the coagulation time of rat blood in the presence of oligonucleotides of animal origin or xylan-polysulfuric acid and heparin added in vitro.

| Drug used | γ/ml of blood | coagulation time sec average ± S.E. | % |
| --- | --- | --- | --- |
| — | — | 140.4 ± 10.3 | — |
| oligonucleotides of animal origin | 45 | 149.8 ± 11.2 | +6.7 |
| | 67.5 | 143.8 ± 11.4 | +2.4 |
| | 101.25 | 145.6 ± 12.7 | +3.7 |
| | 151.875 | 146.3 ± 13.0 | +4.2 |
| xylan-polysulfuric acid | 30 | 179.0 ± 5.1 | +27.5 |
| | 45 | 202.2 ± 6.1 | +44.0 |
| | 67.5 | 236.0 ± 8.4 | +68.0 |
| | 101.25 | 265.8 ± 8.5 | +89.3 |
| heparin | 3 | 191.0 ± 8.3 | +36.0 |
| | 4.5 | 231.5 ± 12.4 | +65.0 |
| | 6.75 | 278.1 ± 17.3 | +98.0 |
| | 10.125 | 329.0 ± 21.0 | +134.0 |

It should be understood that the degradation of the nucleic acid starting materials must be short of the formation of monomer nucleotides. The precise extent of degradation may be defined by the viscosity of the degradation product. The viscosity of the product must be above 1.05 cp, as measured in a 1% solution thereof in 0.5 molar sodium chloride, in order to have the unexpected fibrinolytic activity shown hereinabove. The preferred viscosity range is 1.25 to 1.80 centipoise.

Any water-soluble organic acid, such as acetic acid, formic acid, propionic acid, etc., are operable as the proton releasing substance. The acid may be in the presence of an alkali metal acetate such as sodium acetate. Any cation exchange resin will be operable in the present invention and may be substituted for AMBERLITE IR 120, H form, in Example 2. Suitable cation exchangers include synthetic ion-exchangers made from styrene-divinyl benzene copolymers such as Dowex 50, sulfonated polystyrene copolymer such as Permutit Q, or organic zeolite type cation exchangers such as Nalcite. Duolite C-25 is another example of a suitable cation exchangers. It should be understood, however, that the present invention is not limited to any specific water-soluble organic acid or cation exchange resin and any such compound well be operable in the present invention to degrade the nucleic acid.

The particular liquid non-solvent to the degraded solute used in the precipitating step is not critical to the present invention. The only requirement for this compound is that it be inert to the contents of the neutralized solution and that it be a non-solvent to the degraded solute so that the solute may be precipitated and recovered. Preferred compounds include aliphatic alcohols and ketones having 1–4 carbon atoms.

It will be obvious to those skilled in the art that various changes may be made without departing from the scope of the invention and the invention is not to be considered limited to what is shown in the drawing and described in the specification.

What is Claimed is:

1. A process for the partial degradation of deoxyribonucleic acid extracted from animal organs as alkali salts, said degradation being short of the formation of monomer nucleotides, comprising the steps of:

dissolving the alkali salt os deoxyribonucleic acid in water;

heating the resultant solution at 50°–90° C. in the presence of a proton releasing substance selected from the group consisting of water soluble organic acids and cation exchange resins at a pH between 3.5 and 7 until the deoxyribonucleic acid is degraded to an extent that a 1% solution thereof in 0.5 molar sodium chloride will have a viscosity of greater than 1.05 centipoise and below 1.80 centipoise;

neutralizing the degraded solution, and precipitating the degraded solute by adding a liquid non-solvent to the degraded solute and inert to the components of the neutralized degraded solution.

2. A process in accordance with claim 1, wherein said heating step is continued until said viscosity is from 1.25–1.80 centipoise.

3. A process in accordance with claim 1, wherein said liquid non-solvent is an aliphatic alcohol or ketone having 1–4 carbon atoms.

4. A process in accordance with claim 1, wherein said liquid non-solvent is methanol or acetone.

5. A process in accordance with claim 1, wherein said proton releasing substance is acetic acid in the presence of sodium acetate.

6. A process in accordance with claim 1, wherein said proton releasing substance is formic acid in the presence of sodium acetate.

7. A process in accordance with claim 1, wherein said heating step takes place for a time in the range of 3–5 hours.

8. A process in accordance with claim 1, wherein said proton releasing substance is a cation exchange resin.

9. A process in accordance with claim 2 wherein said proton releasing agent is acetic acid in the presence of sodium acetate and said liquid non-solvent is methanol.

10. A degradation product of deoxyribonucleic acid and having fibrinolytic properties wherein a 1% solution thereof in 0.5 molar sodium chloride has a viscosity between 1.25 and 1.85.

* * * * *